Figure 1:
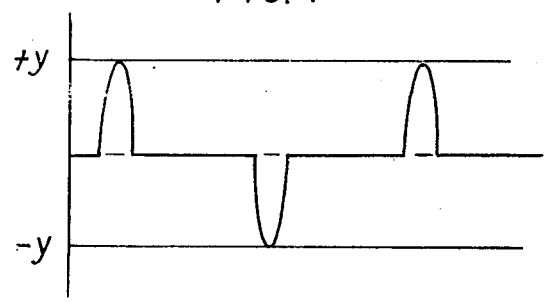

United States Patent [19]

Steigerwald

[11] 4,272,665
[45] Jun. 9, 1981

[54] ENERGY BEAM WELDING A GAP OF VARYING WIDTH

[75] Inventor: Karl H. Steigerwald, Starnberg, Fed. Rep. of Germany

[73] Assignee: Steigerwald Strahltechnik GmbH, Fed. Rep. of Germany

[21] Appl. No.: 965,174

[22] Filed: Nov. 30, 1978

[30] Foreign Application Priority Data

Dec. 5, 1977 [GB] United Kingdom ............... 50579/77

[51] Int. Cl.³ ...................... B23K 15/00; B23K 26/00
[52] U.S. Cl. ...................... 219/121 ED; 219/121 EV; 219/121 EW; 219/137.71; 219/121 LD; 219/121 LW; 219/121 LX
[58] Field of Search ................ 219/121 EB, 121 EM, 219/121 L, 121 LM, 124.34, 124.5, 125.12, 137.7, 137.71, 123, 121 EC, 121 ED, 121 EV, 121 EW, 121 LC, 121 LD, 121 LW, 121 LX

[56] References Cited

U.S. PATENT DOCUMENTS

| 3,131,289 | 4/1964 | Hansen ........................... 219/121 EB |
| 3,204,081 | 8/1965 | Iceland .......................... 219/121 EM |
| 3,230,339 | 1/1966 | Opitz et al. .................... 219/121 EM |
| 3,417,223 | 12/1968 | Steigerwald ................... 219/121 EB |
| 3,621,183 | 11/1971 | Chambonnet ................... 219/124.34 |
| 3,956,610 | 5/1976 | Kanbe et al. .................. 219/137.7 X |
| 4,151,395 | 4/1979 | Kushner ........................ 219/125.12 |

FOREIGN PATENT DOCUMENTS 1270708 6/1968 Fed. Rep. of Germany .
2634342 2/1978 Fed. Rep. of Germany ... 219/121 EM

*Primary Examiner*—Richard R. Kucia
*Assistant Examiner*—Keith E. George
*Attorney, Agent, or Firm*—Brumbaugh, Graves, Donohue & Raymond

[57] ABSTRACT

A method of energy beam welding, as electron beam welding is disclosed, wherein the supply rate of filler material is continuously varied in accordance with the width of a gap between two workpiece parts to be welded together. Further, the specific energy input per area as well as the energy distribution along the weld seam produced are also controlled as a function of the width of the gap. The control may consist in a variation of the repetition rate of beam deflections across the gap or the variation of the amplitude of a beam deflection component parallel and/or transverse of the gap.

8 Claims, 7 Drawing Figures

ENERGY BEAM WELDING A GAP OF VARYING WIDTH

The present invention relates to energy beam welding, such as for example, welding with a laser beam, or an electron beam, specifically butt welding.

BACKGROUND AND PRIOR ART

In butt welding two workpieces, such as steel plates, which are separated by a gap of varying width, the energy beam must be oscillated transversely to the longitudinal direction of the gap to be closed by the weld seam, and the width of oscillation must be at least equal, and preferably somewhat larger than, the maximum width of the gap to produce an acceptable weld seam of substantially constant width. Furthermore, additional or filler material must be supplied to the zone of welding to make up the deficiency in material corresponding to the gap, the supply of additional or filler material being generally controlled in dependence upon the width of the gap, see e.g. German Auslegeschrift No. 1,270,708.

Under the conditions outlined above, the amount of energy required for producing a weld seam of predetermined width should be substantially constant while the local energy demand needed for melting the respective portions of the workpieces to be joined, and for melting an additional material, varies as a function of the width of the gap. Thus, at a location where the width of the gap is relatively small and the feeding rate of the additional material is correspondingly low, the energy of the energy beam is consumed mainly in melting the marginal portions of the workpieces which form the gap, while in the case of a wide gap and a correspondingly high feeding rate of the additional material a large portion of the energy is used for melting the additional material.

It is known from U.S. Pat No. 3,131,289 to vary the wave-shape of the periodical signal which controls the transverse oscillation of an electron beam across a seam to be welded. This, however, varies the energy distribution across the seam rather than along the seam, because the frequency of transverse oscillation is maintained constant.

Further, U.S. Pat. No. 3,417,223 discloses an electron beam welding method wherein additional material is supplied to the welding site. In some embodiments of this known method, the relative amount of energy supplied by the beam to the workpiece material and the additional material, respectively, is controlled by deflecting the beam such that, in a first position, it strikes mainly the workpiece material, and in a second position it strikes mainly the additional material. However, the known method does not provide for measuring the width of a gap between two workpiece parts to be welded together and no control of the beam deflection in dependence of such width.

THE INVENTION

It has been found, that weld seams of optimal quality can be obtained only when the local distribution of the beam energy between the workpiece material and the additional material is taken into account. On the basis of these findings, the present invention proposes an energy beam welding method which provides for a local control of the supply of beam energy to the welding zone within which the edge regions of the workpiece and the additional or filler material, which is generally supplied in the form of a wire or a band, are fused.

According to the invention, the local control of the supply of beam energy to the welding zone is provided by recurrent variation of the amplitude of the transverse oscillation of the beam, e.g., a more or less periodic switching between at least first and second amplitudes of the transverse oscillation, the ratio of succeeding intervals of transverse oscillations of first and second amplitudes depending on the width of the gap to be closed by the weld seam, i.e. on the feeding rate of the additional or filler material. Thus, the energy supplied by the beam to a length unit or increment of the seam is varied in accordance with the width of the gap, preferably about proportional to said width.

The first amplitude is preferably the maximum amplitude, which depends on the maximum width of the gap as mentioned above, while the second amplitude has a lower value than the first amplitude. The lower value may be zero.

Thus, in a first embodiment of the invention, intervals of time within which the amplitude of the transverse oscillation has its maximum value alternate with intervals where the amplitude of oscillation is small or even zero. The length of the intervals, during which the amplitude of the transverse oscillation has its maximum value, may be maintained constant while the length of the intervals during which the amplitude has the lower or zero value may be regulated as a function of the width of the gap to be welded such that the length increases with increasing gap width and vice versa. Thus, the beam energy is concentrated to a higher degree to the additional or filler material when the supply rate of this material is high, while the energy is concentrated to a higher degree to the edge regions of the workpiece in locations where the gap width is small.

The transverse oscillation of the energy beam can be effected in a known manner, e.g., the beam may perform a circular motion, an X-shaped or Y-shaped motion, a sinusoidal transverse motion, a transverse motion corresponding to a triangular function of time, while the workpiece is moved relatively to the mean beam axis in the longitudinal direction of the gap.

Figure 3:
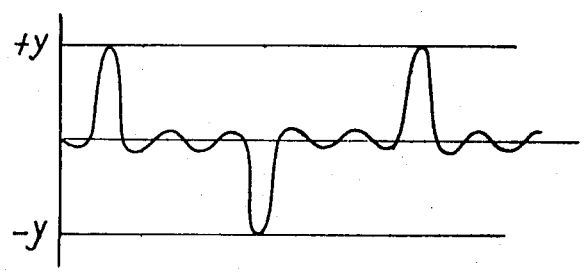
Figure 4:
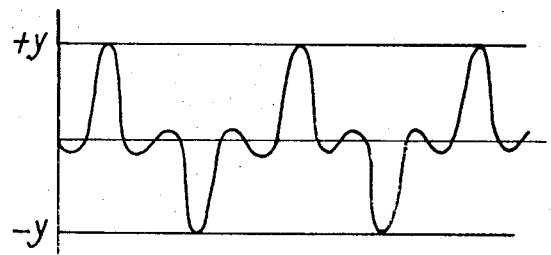
Figure 5:
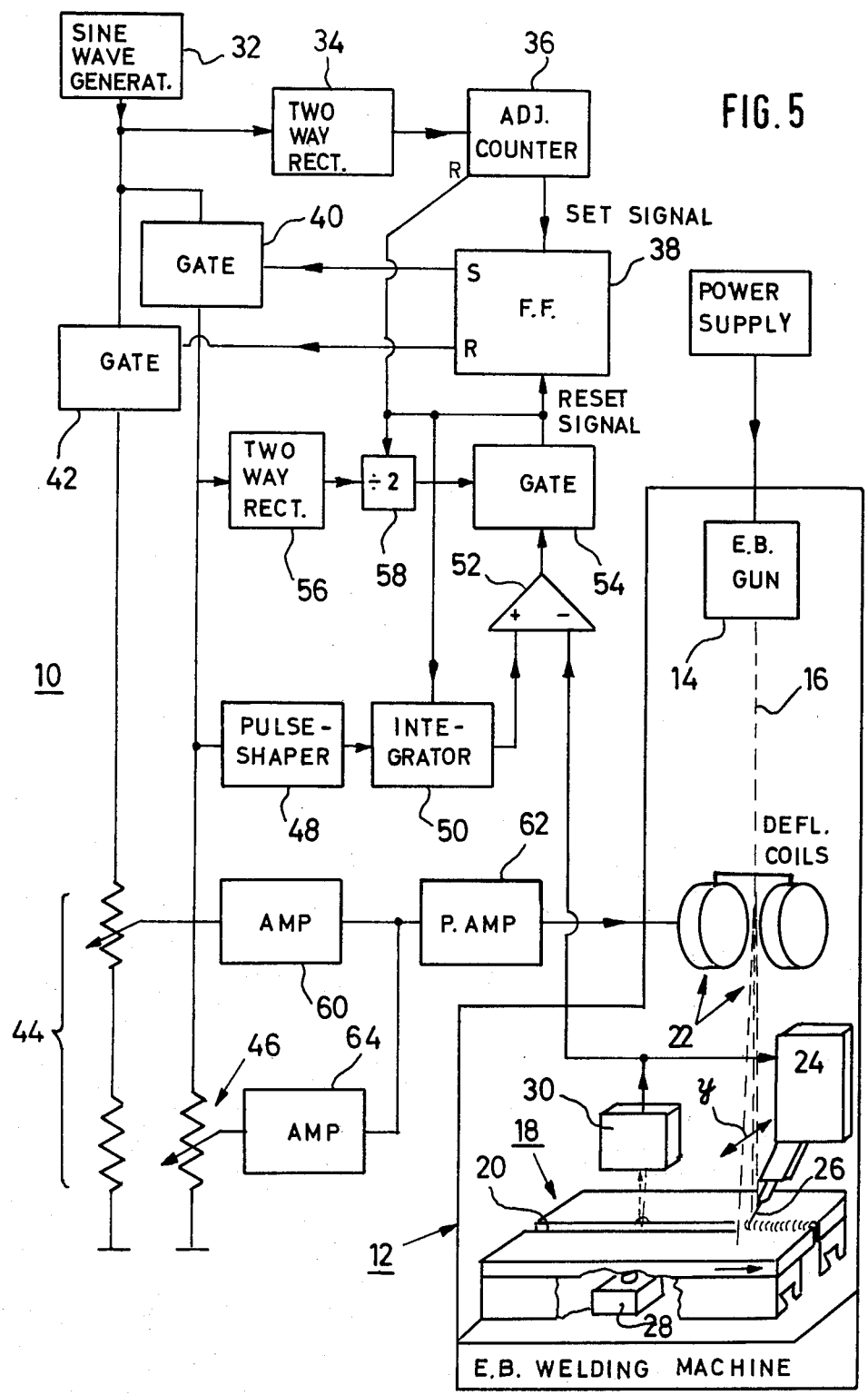
Figure 6:
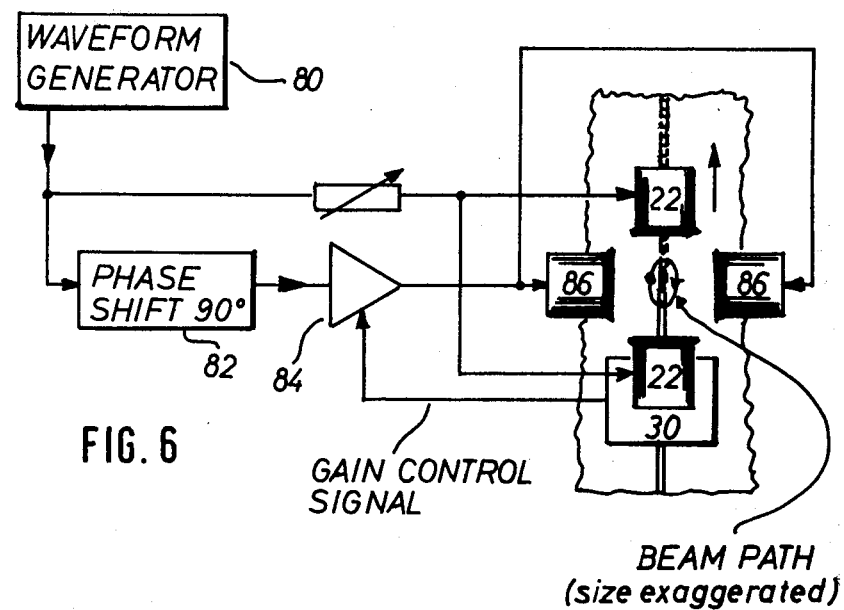
Figure 6A:
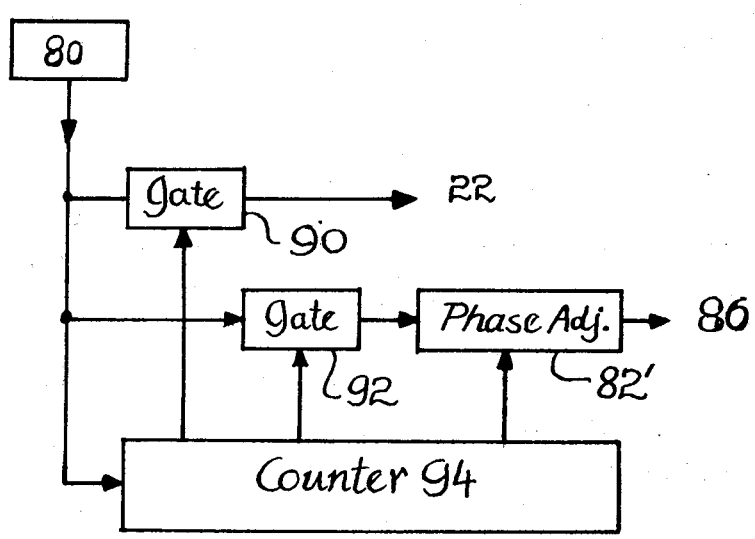

The invention will now be described in more detail, solely by way of example, with reference to the accompanying drawings in which FIGS. 1 to 4 are graphical representations of the amplitude of the transverse oscillation of an electron beam as a function of time, FIG. 5 is a schematic representation of a preferred apparatus for carrying out a method in accordance with the invention, and FIGS. 6 and 6A are schematic representations of another apparatus for carrying out the method in accordance with the invention.

The invention can be put into practice with any beam welding machine having means for supplying a filler material to the welding site, and means for determining the size of the gap along the seam to be welded. Further, additional means must be provided for effecting the beam deflection control according to the invention. A preferred embodiment of such means will be described with reference to FIG. 5.

Figure 2:
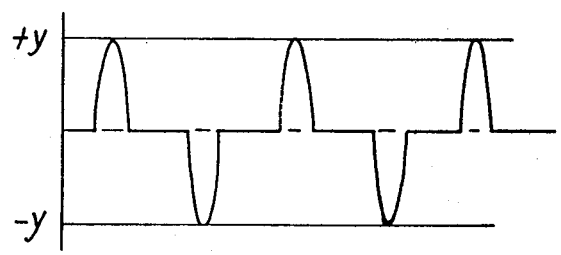

The diagram of FIGS. 1 and 2 show examples of time functions of beam oscillation when welding a relatively large and a relatively small gap, respectively. The beam performs pulse-like deflections in alternate directions with intervals of no deflection at all between these deflections. During the intervals of no deflection, the beam impinges on the additional or filler material which is supplied to the middle of the gap.

FIGS. 3 and 4 illustrate another embodiment of the method, according to the invention, FIG. 3 showing the oscillations used for welding a gap of large width, and FIG. 4 the oscillations used for welding a gap of relatively small width. The large deflections are similar to those of FIGS. 1 and 2. However, in contrast to those figures, the amplitude of oscillations is not zero during the intervals between the last deflection.

Thus, the invention discloses a method for providing a predetermined local distribution of the beam energy along the weld seam during energy beam welding, preferably electron beam welding, of a butt weld, wherein the beam is oscillated transversely to the longitudinal direction of the weld seam produced, the improvement consisting in providing oscillations having a maximum peak-to-peak amplitude chosen to cover the maximum width of the gap between the edges of the workpieces to be joined by the weld seam to be produced, which alternate with oscillations of another, smaller amplitude. The stage of oscillations of maximum amplitude may comprise a single half-wave of transverse oscillation or a number of such half-waves or pulses of alternating polarities.

Alternatively, maximum deflections in alternate directions, as shown in FIG. 1, may alternate with stages within which the amplitude is smaller or even zero. The deflections of maximum amplitude in alternating directions refer to a mean or undeflected beam path, which preferably is aligned to the middle of the gap. The wave-shape and the length of the stages during which the peak-to-peak amplitude or the amount of deflection in alternating directions has the maximum value may be maintained constant while the length of the stages during which the amplitude of the oscillation has its lower or zero value may be regulated as a direct function of the gap width or feeding rate of the additional material.

The circuit 10 shown in FIG. 5 can be used in combination with any conventional electron beam (E.B.) welding machine comprising means for supplying additional material, e.g. in form of a wire or band of metal, to the welding site, and means for measuring the width of the gap to be welded. Since such E.B. weldings machines are well known in the art, the E.B. welding machine 12 is shown in FIG. 5 only schematically. It comprises a beam gun 14 producing a high-energy focussed electron beam 16 directed to a workpiece arrangement 18 having a gap 20 to be welded. The electron beam 16 can be deflected by deflection coils 22 across the gap 20, the frequency and amplitude of deflection being controlled by a deflection signal provided by the control circuit 10 according to the invention.

An apparatus 24, which may be of known type, delivers a filler wire 26 to a molten pool of metal produced by the beam 16 in the workpiece arrangement.

The width of the gap 20 is measured by any suitable type of measuring device, which is shown in FIG. 5 as comprising a gamma ray source 28 which is positioned behind the workpiece arrangement 18 and produces a collimated beam of gamma rays. A portion of the gamma ray beam dependent on the width of the gap 20 falls through this gap on a gamma ray detector 30 which produces a "width" signal proportional to the width of the gap. Other known gap width measuring devices may be used instead of the described measuring system 28–30.

The circuit 10 comprises a sine-wave generator 32 of preferably adjustable frequency which produces a sine wave output which forms the base for the signals shown in FIGS. 1 to 4. The frequency of the sine wave signal may be e.g. 400 to 4000 Hz. The output of the sine wave generator 32 is applied to the input of a two-way rectifier circuit 34 which provides an output signal having twice the frequency of the output of the sine way generator 32. The output of the rectifier 34 is coupled to the input of a counter circuit 36 which delivers, after having received a predetermined, preferably adjustable, number of input pulses, an output pulse which is applied as set signal to a flipflop circuit 38. The setting of the counter 36 determines the number of excursions of the higher amplitude performed by the beam; thus, the waveforms of FIGS. 1 to 4 are produced when the counter 36 is set to "1".

The output of the sine-wave generator is further applied to the input of a first and a second transmission gate 40, 42, respectively. The output of gate 42 is connected to a potentiometer circuit 44 by which the amplitude of the larger excursions can be set while the output of gate 40 is connected to a potentiometer circuit 46 by which the amplitude of the smaller excursions can be set. The control inputs of gates 40 and 42 are connected to set and reset outputs S, R, respectively of flipflop 38, so that gate 40 is transmissive and gate 42 is non-transmissive when the flipflop 38 is in the set state and vice versa.

The output of gate 40, which transmits the sine wave when flipflop 38 is set, is connected to a pulse shaping circuit 48 producing pulses of predetermined constant area which are applied to an integrator circuit 50 which integrates these pulses and produces a d.c. signal which is applied to a first input of a comparator circuit 52 which may comprise a differential amplifier.

The other input of comparator 52 is the width signal from the gamma detector 30. Further, the width signal may be applied to the filler wire feeding device 24 to control the filler wire supply rate essentially proportional to the width of the gap 20.

The output of comparator 52 is coupled through a further transmission gate 54 to the reset input of flipflop 38.

The control input of gate 54 is provided by a circuit comprising a two-way rectifier 54 and a scale-of-two or divider circuit 58. The input of rectifier 56 is the output of gate 40 and the output of the rectifier is coupled to the divider circuit 58, the output of which being the control signal which makes the gate 54 transmissive.

The reset signal from the output of gate 54 is further applied to integrator 50, divider circuit 58 and counter 36 to reset these circuits.

The outputs of the potentiometers 44, 46 are coupled through insulating amplifiers 60 and 64, respectively, e.g. emitter followers, to the input of a power amplifier 62 which produces an output signal for driving the deflection coils 22.

In the following description of the operation of the system described above with reference to FIG. 5 it will be assumed that, at the beginning, counter 36, flipflop 38, integrator 50 and divider 58 are reset. When the sine-wave generator commences producing sine-wave output signal, this signal will be full-wave rectified and, thus, the counter 36 counts each excursion of the signal. Further, the sine-wave signal is transmitted through gate 42, potentiometer 44, amplifiers 60 and 62 to drive the deflection coils which produce one or a number of corresponding excursions of the electron beam across the gap 20.

After a predetermined number of excursions, counter 36 produces a set signal which switches flipflop 38 in the set state, thus, gate 42 becomes non-transmissive and gate 40 becomes transmissive. The integrator 50 starts integrating the constant area pulses received from pulse shaper 48, thus, the d.c. output of integrator raises proportional to the number of the small (or zero) amplitude excursions which are produced by the circuit comprising potentiometer 46, amplifier 64 and amplifier 62.

When the d.c. output of integrator 50 applied to the first input of comparator 52 exceeds the width signal provided by the gap width measuring device, i.e. detector 30, comparator 52 produces an output level at the signal input of the gate 54. The gate is made transmissive by the next output of divider circuit 58 and produces then a signal resetting the flipflop 38, the divider 58 and the counter 36. The purpose of the circuit 56-58 is to provide an even number of small amplitude excursions, so that each period of small (or zero) amplitude excursions is framed by larger amplitude excursions of opposite polarity.

The position of the width detecting system 28–30 is as close as possible to the welding site or a known delay system is included in the connection between the width measuring system and the devices controlled by the width signal to compensate for the lag between the time of width measurement and the welding of a predetermined point of the seam.

It is also possible, to maintain the frequency and amplitude of the transverse component and the frequency of the longitudinal component of the beam deflection constant and vary only the amplitude of the longitudinal component of beam deflection dependent on the gap width. In this case, the beam path may be elliptic, the length of one axis of the ellipse being variable. Such a beam deflection can be provided by a very simple circuitry shown schematically in FIG. 6: A sine-wave oscillator 80 provides a driving signal for the transverse deflection component provided by deflection coils 22. The signal is further applied to a phase shifter 82 providing a phase shift of 90 degrees and the quadrature signal produced is applied through a variable gain amplifier 84 to deflection coils 86 for the longitudinal deflection component. The gain of the amplifier 84 is controlled as a direct function of the gap width signal derived from a gap with measuring device, e.g. gamma ray detector 30.

FIG. 6A shows a modification of the circuit of FIG. 6A switch or gate 90, 92 is connected in series with the leads connecting the output of generator 80 to deflection coils 22, and phase shifter 82, respectively. The gates are actuated by the outputs of an adjustable counter circuit 94 having an input receiving the output of generator 80. Further, a phase shifting circuit 82' is used, which can be switched to different values of phase shift by an output signal of counter 94.

The circuit of FIG. 6A is very versatile. E.g a cross-shaped beam path is produced when the outputs of the counter are set such that gates 90 and 92 are alternatively opened and closed during subsequent periods of the sine wave from generator 80. A X-shaped deflection is produced by shifting the phase of the wave applied to coils 86 by 180 degrees each second period of the oscillator wave, the gates being maintained permanently transmissive. Various other beam path configurations are possible and will occur to the skilled artisan.

If desired, a generator producing waveforms of other shapes, e.g. triangular or square wave shape, can be substituted for sine wave generator 80.

Thus, the inventor provides a beam welding system, wherein the supply rate of filler material is continuously varied in accordance with the gap width and the corresponding variation of the specific energy input per area as well as the energy distribution along the weld seam are effected by repetition rate (periodicity) variation and/or intermittent control of a transverse oscillation of the beam (which may comprise a longitudinal component parallel to the welding direction).

I claim:

1. An energy beam welding method for forming a weld seam along a gap of varying width defined by two workpiece edges to be welded together, said gap having a length direction, comprising the steps of:
   directing an energy beam to a welding location including said gap, said energy beam having an average direction;
   producing a first relative motion between said beam and said workpiece arrangement such that said average direction proceeds along said gap in said length direction to produce a weld seam joining said workpiece edges;
   producing a second relative motion between said beam and said gap, said second relative motion being repetitive and having a direction essentially perpendicular to said length direction of said gap, and having a maximum peak-to-peak amplitude at least as large as the maximum expected width of said gap;
   measuring the width of the gap and producing a width signal;
   supplying additional material to the welding location;
   controlling the rate of supply of additional material as a function of said width signal;
   said second relative motion taking place during first time intervals, with said maximum peak-to-peak amplitude, and second time intervals, alternating with said first intervals, during which the peak-to-peak amplitude is smaller than said maximum amplitude, and wherein the ratio of said first time intervals to said second time intervals is varied as a function of said width signal.

2. The method as claimed in claim 1 wherein said ratio is decreased with increasing gap width.

3. The method as claimed in claim 1 wherein said second relative motion during said first time intervals comprises oscillations of said beam across the gap, and wherein the repetition rate of said first time intervals is controlled by said width signal.

4. The method as claimed in claim 1 wherein said first intervals have a constant time duration and the time duration of said second intervals is controlled by said width signal.

5. The method as claimed in claim 4 wherein said relative motion amplitude during said second time intervals is zero.

6. The method as claimed in claim 1 wherein each of said first intervals comprises a single, pulse-like deflection of the beam from said average direction, the beam deflections of subsequent first intervals extending in opposite direction with respect to said average direction.

7. The method as claimed in claim 6 wherein the average direction is aligned with the middle of the gap.

8. The method as claimed in any of the claims, 1 to 5, 6–7 wherein said beam is an electron beam.

* * * * *